United States Patent
Hosokawa

(10) Patent No.: US 7,050,361 B2
(45) Date of Patent: May 23, 2006

(54) MAGNETO-OPTICAL STORAGE MEDIUM AND OPTICAL DISK DRIVE

(75) Inventor: Tetsuo Hosokawa, Higashine (JP)

(73) Assignee: Fujitsu Limited, Kawasaki (JP)

( * ) Notice: Subject to any disclaimer, the term of this patent is extended or adjusted under 35 U.S.C. 154(b) by 680 days.

(21) Appl. No.: 10/104,890

(22) Filed: Mar. 22, 2002

(65) Prior Publication Data
US 2002/0141293 A1   Oct. 3, 2002

(30) Foreign Application Priority Data
Mar. 27, 2001   (JP) ............................. 2001-091273

(51) Int. Cl.
*G11B 11/00*   (2006.01)
(52) U.S. Cl. .................. 369/13.43; 369/283; 369/288; 369/13.53
(58) Field of Classification Search ............ 369/13.01, 369/13.02, 13.35, 13.38, 13.39, 13.4, 13.41, 369/13.42, 13.43, 13.48, 13.53, 94, 283, 369/286, 288
See application file for complete search history.

(56) References Cited

U.S. PATENT DOCUMENTS

| | | | |
|---|---|---|---|
| 5,719,829 A * | 2/1998 | Nishimura | 369/13.38 |
| 6,086,993 A * | 7/2000 | Yoshinari et al. | 428/336 |
| 6,118,736 A * | 9/2000 | Takahashi et al. | 369/13.43 |
| 6,246,640 B1 * | 6/2001 | Shimazaki et al. | 369/13.1 |
| 6,338,911 B1 | 1/2002 | Mori et al. | 428/694 |

FOREIGN PATENT DOCUMENTS

| | | |
|---|---|---|
| JP | 07-296434 | 11/1995 |
| JP | 09-312043 | 12/1997 |
| JP | 10-334529 | 12/1998 |
| JP | 11-278392 | 10/1999 |
| JP | 2000-132879 | 5/2000 |
| JP | 2000-339788 | 12/2000 |

* cited by examiner

*Primary Examiner*—Paul W. Huber
(74) *Attorney, Agent, or Firm*—Greer, Burns, Crain, Ltd.

(57) ABSTRACT

A magneto-optical storage medium that protects against the effects of cross-talk, making it possible to further reduce the level of track density, and which also makes it possible to conduct high-density recording/playback with a reduced magnetic field for erasure and a favorable level of playback signal quality. More specifically, a magneto-optical storage medium, which includes at least the following laminated layers, in the following order: a playback layer, a non-magnetic layer, a transfer layer, a cut-off layer, and a recording layer. The playback layer preferably displays easy in-plane magnetization characteristics within the monolayer at room temperature, and the transfer layer and the recording layer each have easy magnetization characteristics in the vertical direction of the monolayers at room temperature when each layer is considered as a monolayer. In addition, if the Curie temperature for the cut-off layer is designated as $Tc_s$, and the Curie temperature for the recording layer is designated as $Tc_k$, then $Tc_s < Tc_k$.

17 Claims, 13 Drawing Sheets

RELATIONSHIP BETWEEN THE Co COMPOSITION OF THE CUT-OFF LAYER AND Tc

RELATIONSHIP BETWEEN Tc OF THE CUT-OFF LAYER AND THE C/N LEVEL

RELATIONSHIP BETWEEN THE Tb COMPOSTION OF THE RECORDING LAYER AND THE CROSSTALK LEVEL

RELATIONSHIP BETWEEN THE Dy COMPOSTION OF THE RECORDING LAYER AND THE MAGNETIC FIELD FOR ERASER

MAGNETO-OPTICAL STORAGE MEDIUM AND OPTICAL DISK DRIVE

BACKGROUND

This invention pertains to a magneto-optical storage medium in which it is possible to reduce cross-talk from adjacent tracks, increase track density, and reduce the magnetic field applied during erasure.

In recent years, due to the need for managing high-volume information such as moving image data, etc., there has been a demand for a magneto-optical storage medium that has a higher level of memory storage capacity. For this reason, technical developments have advanced to the point where recording marks (magnetic domains) are micro-sized, further reducing bit density and track density. In addition, the heat distribution of the playback light beams can be utilized in a method called magnetically induced super resolution (MSR) recording/playback, which is a technique involving a recording mark is that is smaller than a spot beam diameter.

A medium to which the MSR method is applied consists of a recording layer in which a magnetic domain is recorded, as well as a multilayer that includes at least a playback layer, onto which the magnetic domain of the recording layer is transferred. When irradiating a light beam with a power level suitable for playback, a temperature distribution occurs such that some areas are heated to a higher temperature than other areas. The magnetic characteristics are adjusted so that an area with either a specified maximum temperature or a specified minimum temperature functions as a magnetic mask. As a result, this magnetic mask provides the same effect as micro-sizing the spot diameter, making it possible to playback only the desired minute marks.

Examples of this type of MSR method that have been introduced include operations conducted in response to a given position at which a mark within the light beam spot is detected, such as front aperture detection (FAD), center aperture detection (CAD), and rear aperture detection (RAD), as well as a double mask RAD method in which the areas to the front and rear of a mark to be played back are masked and the center portion is detected.

Examples of the CAD-type MSR storage medium include recording layers that are made from vertically magnetized films comprised of TbFeCo (terbium, iron, and cobalt), as well as non-magnetic layers comprised of SiN (silicon nitride). Added to the top layer is a multilayer film that contains at least a playback layer comprised of GdFeCo (gadolinium, iron, and cobalt), which at room temperature is an in-plane magnetization film within the surface of the monolayer (i.e., a single layer considered alone) that converts to a vertical magnetization film once a specified temperature is exceeded. Also, since a CAD-type medium undergoes vertical magnetization at the aperture location, which is an area in which the temperature exceeds the specified temperature of the playback layer within the spot beam during playback, it is possible for magnetization to be detected through Kerr rotation of the light beam's plane of polarization. However, since in-plane magnetization occurs along the playback layer portion that is either outside of the spot beam or outside of the aperture location, magnetization cannot be detected along this portion.

Furthermore, in the case of the CAD-type medium, magnetostatic bonding causes the magnetization direction of the playback layer to change when subjected to the magnetic field from the recording layer, and therefore it becomes necessary to make the recording layer of a TM-rich composition, which materials have a high level of magnetization (Ms). Such a material is also referred to as a TM-dominant composition. TM-rich, and TM-dominant, refer to substances in which the sub-lattice magnetization of the transition metal is higher than that of the rare earth metal.

However, the problem with this TM-rich recording layer is that a large magnetic field is required for erasure. Another problem with a TM-rich recording layer is that magnetic fields are also generated from marks that are written onto the recording layer of adjacent tracks that are not being played back. The magnetic fields from these adjacent tracks affect the track being reproduced during playback, and cross-talk occurs due to the magnetostatic bonding strength. In order to prevent these problems from occurring, it is possible to reduce the level of FeCo, which is to say that an RE-rich composition can be used. (Such a material is also referred to as an RE-dominant composition. RE-rich, and RE-dominant, refer to substances in which the sub-lattice magnetization of the rare earth metal is higher than that of the transition metal. However, since there is a low level of magnetization Ms within an RE-rich recording layer at playback temperatures, playback becomes difficult due to the fact that recording layer marks cannot be sufficiently transferred onto the playback layer.

The purpose of this invention is to present a magneto-optical storage medium that protects against the effects of cross-talk, making it possible to further reduce the level of track density, and which also makes it possible to conduct high-density recording/playback with a reduced magnetic field for erasure as well as with a favorable level of playback signal quality.

According to this invention, a magneto-optical storage medium is comprised of at least the following laminated layers, in the following order: a playback layer, a non-magnetic layer, a transfer layer, a cut-off layer, and a recording layer. The playback layer preferably displays easy in-plane magnetization characteristics within the monolayer at room temperature. In this specification, the term "monolayer" refers to a single layer in which the magnetic characteristics are measured in that single layer, without any magnetic influence from any adjacent layers. Both the transfer layer and recording layer preferably have easy magnetization characteristics in the vertical direction of the monolayers at room temperature. In addition, if the Curie temperature for the cut-off layer is designated as Tc and the Curie temperature for the recording layer is designated as $Tc_k$, then preferably $Tc_s < Tc_k$. Furthermore, with a Curie temperature for the transfer layer designated as $Tc_t$, this invention is also preferably characterized by a relationship in which $Tc_t > Tc_s$. In addition, with the respective film thicknesses for the transfer layer, the cut-off layer, and the recording layer given as $T_t$, $T_s$, and $T_k$, this invention is also preferably characterized by a relationship in which $T_s < T_t$ and/or $T_s < T_k$.

The present magneto-optical storage medium is comprised of at least the following laminated layers, in the following order: a playback layer, a non-magnetic layer, a transfer layer, a cut-off layer, and a recording layer. Further, the playback layer displays easy in-plane magnetization characteristics within the monolayer at room temperature, the transfer layer and the recording layer both have easy magnetization characteristics in the vertical direction of the monolayers at room temperature, and the respective film thicknesses for the transfer layer and the cut-off layer are given as $T_t$ and $T_s$, and where $T_t > T_s$. Furthermore, with the film thickness for the recording layer given as $T_k$, this magneto-optical storage medium is characterized by a relationship in which $T_s < T_k$.

In addition, the present magneto-optical storage medium is characterized by the fact that the playback layer is preferably a material comprised of GdFeCo, which is rich in the raw earth metal Gd at room temperature (i.e., the material is RE-rich at room temperature).

In addition, the present magneto-optical storage medium is characterized by the fact that the transfer layer is preferably a material comprised of GdDyFeCo, which is a compensating substance or is rich in its FeCo composition (TM-rich) at room temperature.

In addition, the present magneto-optical storage medium is characterized by the fact that the cut-off layer is preferably a material comprised of TbFe or TbFeCo.

In addition, the present magneto-optical storage medium is characterized by the fact that the recording layer is preferably a material comprised of rare earth-transition metals, and this substance is a compensating substance or is rich in rare earth types (RE-rich) at room temperature.

Furthermore, this magneto-optical storage medium is characterized by the fact that the cut-off recording is preferably a material comprised of TbFeCo, DyFeCo, TbDyFeCo, or GdTbDyFeCo.

Furthermore, the magneto-optical storage medium of the present invention can be used in an optical device/storage device that contains at least the following: a light emission assembly used to irradiate a light beam; a magnetic field emission assembly used to apply a magnetic field; a power control system used to set/control the power level of the light beam as it corresponds to the storage medium; and a magnetic field control system that sets/controls the direction as well as the size of the magnetic field as they correspond to each access of the storage medium.

In addition, the present invention also relates to an optical disk drive that includes a light emission assembly to irradiate a light beam upon an optical disk, a magnetic field emission assembly to apply a magnetic field to an optical disk, and a power control system to control the power of said light beam and a magnetic field control system to control the magnitude and direction of the magnetic field. The power control system and the magnetic field control system are configured such that during a data recording process, the light beam is controlled to a recording power to raise the temperature of a portion of an optical disk being recorded to a first temperature and the magnitude of the magnetic field is controlled to apply a recording magnetic field, such that magnetic domains in a recording layer of an optical disk are reoriented, without reorienting associated magnetic domains in a playback layer of an optical layer. In addition, during a data reproducing process, the light beam is controlled to a reproducing power to raise the temperature of a portion of an optical disk being recorded to a second temperature, which is lower than the first temperature, and the magnitude of the magnetic field is controlled to apply a reproducing magnetic field, which is lower than the recording magnetic field, such that magnetic domains of a playback layer of an optical disk are reoriented to coincide with associated magnetic domains in a recording layer of a magnetic disk.

In addition, the power control system and the magnetic field control system of the present optical disk drive may also be configured such that during a data erasing process, which is performed prior to said data recording process, the light beam is controlled to an erasing power, and the magnitude of the magnetic field is controlled to apply an erasing magnetic field.

DESCRIPTION OF THE PREFERRED EMBODIMENTS

Figure 1:
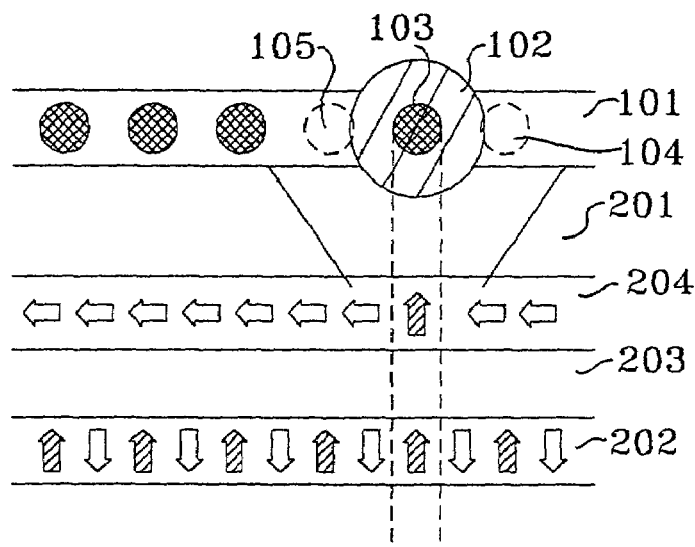
FIG. 1 is a diagram for explaining the theory behind the CAD type medium.

FIG. 1 is a diagram for explaining the theory behind the CAD-type medium. This medium is comprised of at least a recording layer 202 and a playback layer 204 that are laminated onto a transparent substrate 201, with a dielectric layer 203 installed between these two layers. The light beam is irradiated from the side that is nearer to the transparent substrate 201. In addition, the erasure magnetic field 212, the recording magnetic field 213, and the playback magnetic field 211 are applied from the side that is nearer to the recording layer 202.

The magnetization of the recording layer 202 along the specified track 101 on top of the medium is arranged in a specified direction through the application of an erasure-power light beam and an erasure magnetic field 213, after which the recording-power light beam and the recording magnetic field 212 are applied to the portion in which a recording mark is to be formed. This causes the direction of magnetization to change such that it is opposite from the aforementioned specified direction, which results in the performance of a recording operation.

In addition, as a result of the heat that is created from the playback magnetic field and the playback-power light beam during the playback process, the low-temperature portions (mask portions) 104 and 105 that are to the outside of the center portion 103 of the beam spot 102 are masked, and the center portion 103 becomes the aperture location.

Note that even if the playback magnetic field is not applied, the temperature control from the light beam alone makes it possible to form a mask portion. Since there is no longer a magnetic effect from the magnetic layers (such as the recording layer, the playback layer, etc.) surrounding the aperture location, there are cases in which the playback magnetic field is simply applied in the specified direction. According to this embodiment, the playback magnetic field has a downward direction, which is the same as the direction of the erasure magnetic field. However, based on the characteristics of the medium, it may also have an upward direction, which is the same as the direction of the recording magnetic field.

Furthermore, although the optical head and magnetic field generator portion are arranged such that the light beam is applied from the side near the playback layer, and the magnetic field is applied from the side near the recording layer, it is possible for both to be applied from the side near the playback layer.

Although the magnetic domain of the playback layer 204 faces the in-plane direction at room temperature, once the temperature is increased through the use of the beam spot, the magnetic domain layer 204 changes from the in-plane direction to the vertical direction. The vertical orientation of the playback that occurs at this point changes to coincide with the orientation of the magnetic domain of the recording layer 202, and this makes it possible to read the aperture location 103, which is a minute mark formed by the beam spot.

Figure 2:
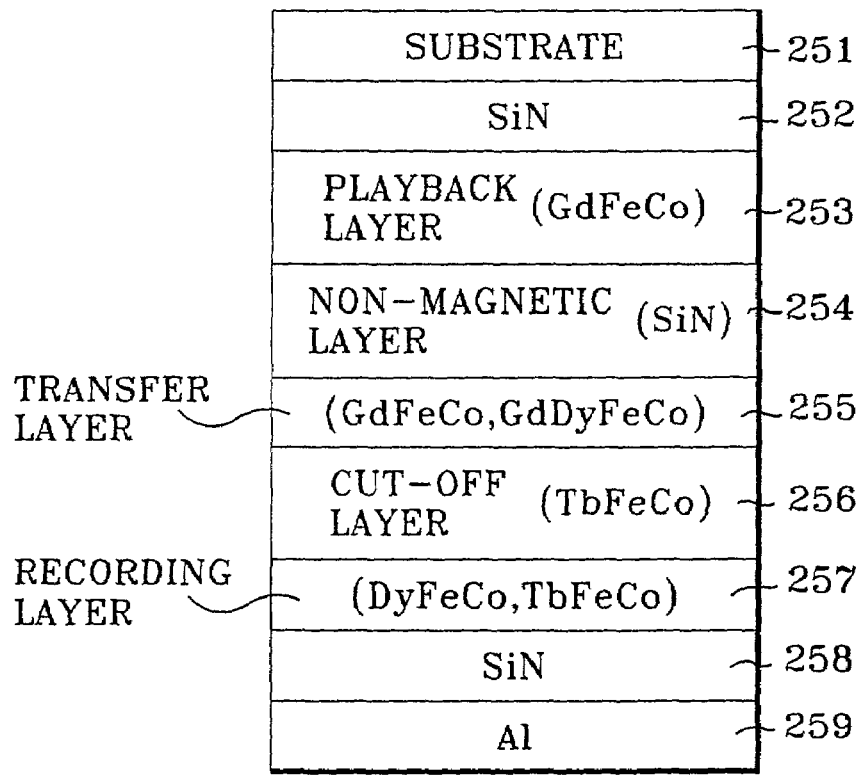
FIG. 2 is a diagram for explaining the construction of a magneto-optical storage medium.

FIG. 2 is a diagram for explaining the construction of the magneto-optical storage medium described in an embodiment of this invention.

This magneto-optical storage medium starts with a transparent substrate 251 made from glass or a resin such as polycarbonate, onto which the following substances are laminated in the following order: a first dielectric layer 252 made from a material such as SiN (silicon nitride), or the like; a playback layer 253; a non-magnetic layer 254; a transfer layer 255; a cut-off layer 256; a recording layer 257; a second dielectric layer 258 made from a material such as SiN, or the like; and a sensitivity adjustment layer 259 made from a material such as Al (aluminum), or the like. Furthermore, in order to prevent oxidation or deterioration, a protective coating is added to the surface of the aluminum top layer, using a material such as a resin that has been hardened through the use of ultraviolet light.

Furthermore, the magnetic layers, namely the playback layer 253, the transfer layer 255, the cut-off layer 256, and the recording layer 257, are constructed of rare earth-transition metal materials (RE-TM materials). Note that in order to provide improved corrosion resistance, sensitivity adjustment capabilities, etc., one or more of the following elements can be added to these rare earth-transition metal materials during the construction of each magnetic layer: Cr (chromium), Ti (titanium), Ta (tantalum), etc.

Note that in addition to the layers already located between the magnetic layers (i.e., the playback layer 253, the transfer layer 255, the cut-off layer 256, and the recording layer 257), it is also possible to add additional layers for a variety of purposes such as sensitivity adjustment, etc.

Furthermore, in general, there are three types of substrates that may be used: groove substrates that have concentric circular or spiral shaped track grooves formed at every other specified space and are used to conduct recording and/or playback of information with respect to the track grooves; land substrates that are used to conduct recording and/or playback of information with respect to the flat land portions of the protrusions between the track grooves; and land/groove substrates that can be used to conduct recording and/or playback of information with respect to groove tracks as well as land tracks, with the track grooves representing the so-called groove tracks, and the flat portions of the protrusions between the track grooves representing the so-called land tracks.

According to this embodiment, a land/groove substrate is used to conduct the following method for the creation of a storage medium. Following is a simple explanation regarding the production method for a magneto-optical storage medium that was used in the tests related to the present invention.

A land/groove substrate that is capable of recording information to adjacent land tracks and groove tracks was prepared. Considering the relationship between the wavelengths of the light beams, the steps between the land portions and groove portions are normally set to a preferred range of approximately 30–200 nm. In this embodiment, a plastic substrate is used in which the spaces between the adjacent land and groove portions are approximately 0.65 μm and the steps between the land and groove portions are approximately 50 nm.

The substrate 251 is inserted into a sputter type film forming device that contains multiple film forming chambers with a maximum ultimate vacuum pressure of $5 \times 10^{-5}$ Pa. The substrate 251 is transported to a first chamber in which the Si target has been set, and Ar (argon) gas is introduced along with $N_2$ (nitrogen) gas in order to conduct a DC sputter discharge until the reactive sputter film forms a SiN layer 252 with a film thickness of 80 nm.

Next, the substrate is moved to a second chamber that is separate from the first chamber. In this second chamber, a GdFeCo (gadolinium, iron, and cobalt) target is used, and in the same fashion, a film 253 comprised of $Gd_{29}Fe_{51}Co_{20}$ is formed at a thickness of 20 nm, at room temperature using an RE-rich composition and with a compensation temperature of room temperature or higher. Note that the compensation temperature is the temperature at which the magnetization difference between TM and RE seems to disappear.

Next, the substrate is returned to the first chamber where a SiN layer 254 is formed with a film thickness of 7 nm. The substrate is then moved to a separate third chamber where a transfer layer 255 comprised of $Gd_{24}Fe_{56}Co_{20}$ is formed at a thickness of 20 nm. The Curie temperature of this transfer layer is 300° C. Note that the Curie temperature is a temperature at which the sub-lattice magnetization disappears.

The substrate is then moved to a separate fourth chamber where a target is set for TbFeCo (terbium, iron, and cobalt), and a cut-off layer 256 comprised of TbFeCo is formed on top of the substrate at a thickness of 8 nm. Multiple targets are set for the cut-off layer 256, resulting in a Co composition of the $Tb_{18}$ $(FeCo_x)_{82}$ (where x is a variable), and multiple sample media are formed with varying Curie temperatures.

After the cut-off layer 256 has been formed, a recording layer 257 comprised of $Tb_{24}FeCo_{10}$ is formed on top of this at a thickness of 25 nm. The Curie temperature of the recording layer 257 is 230° C. Next, the substrate is moved back to the first chamber where a 20 nm SiN layer 258 and a 30 nm Al layer 259 are formed, and on top of this, a protective coating is added using a resin material that has been hardened through the use of ultraviolet light.

In order to provide a recording mark with a length of 0.38 μm on the magneto-optical storage medium that has been created, a laser beam with a ray velocity of 7.5 m/s and a wavelength of 680 nm (objective lens NA=0.55) is used to conduct the recording operation, and the C/N level is measured through the use of a spectrum analyzer.

Figure 3:
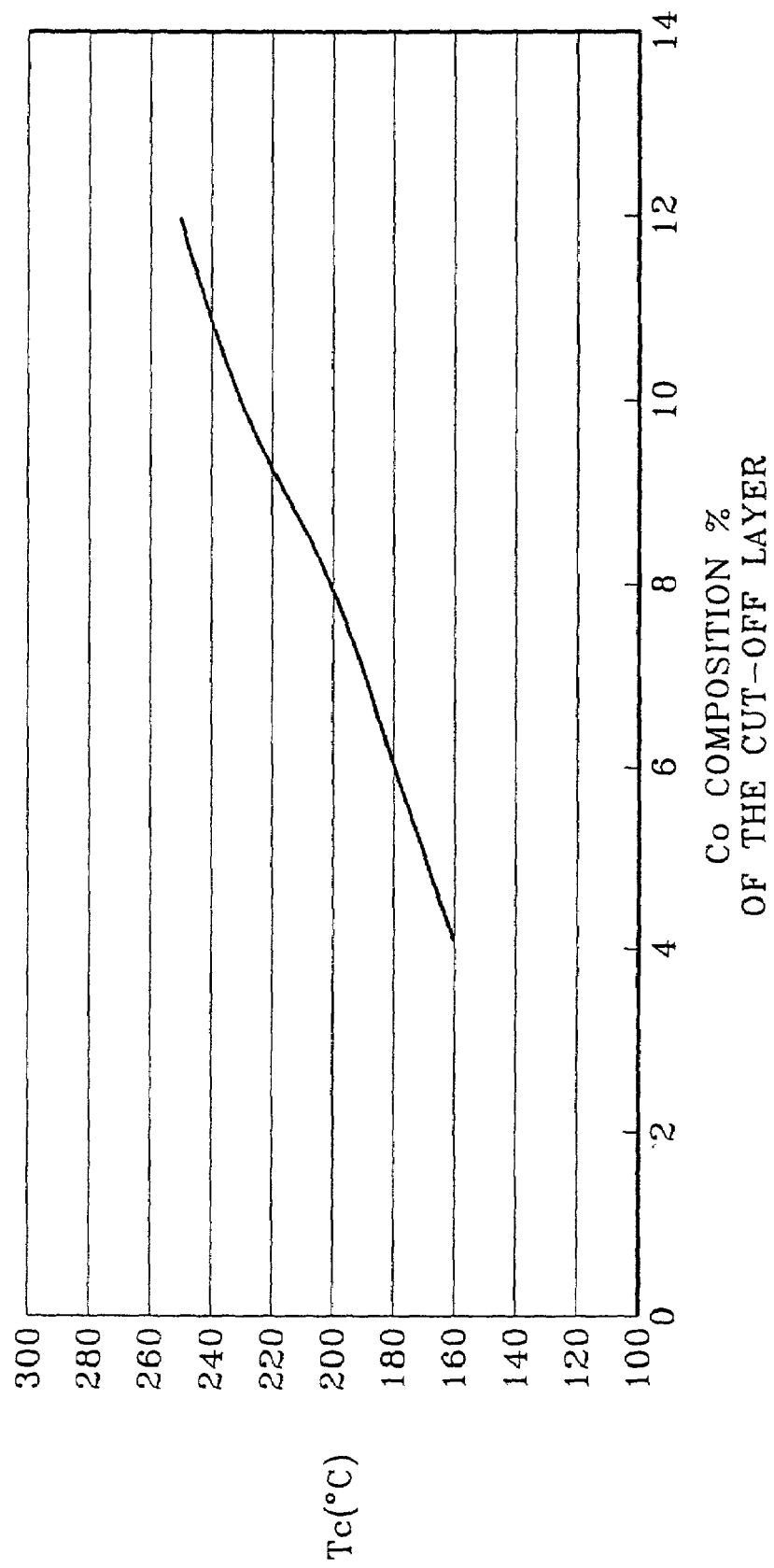
FIG. 3 is a graph that shows the relationship between the Co (cobalt) composition of the cut-off layer and the Tc.
Figure 4:
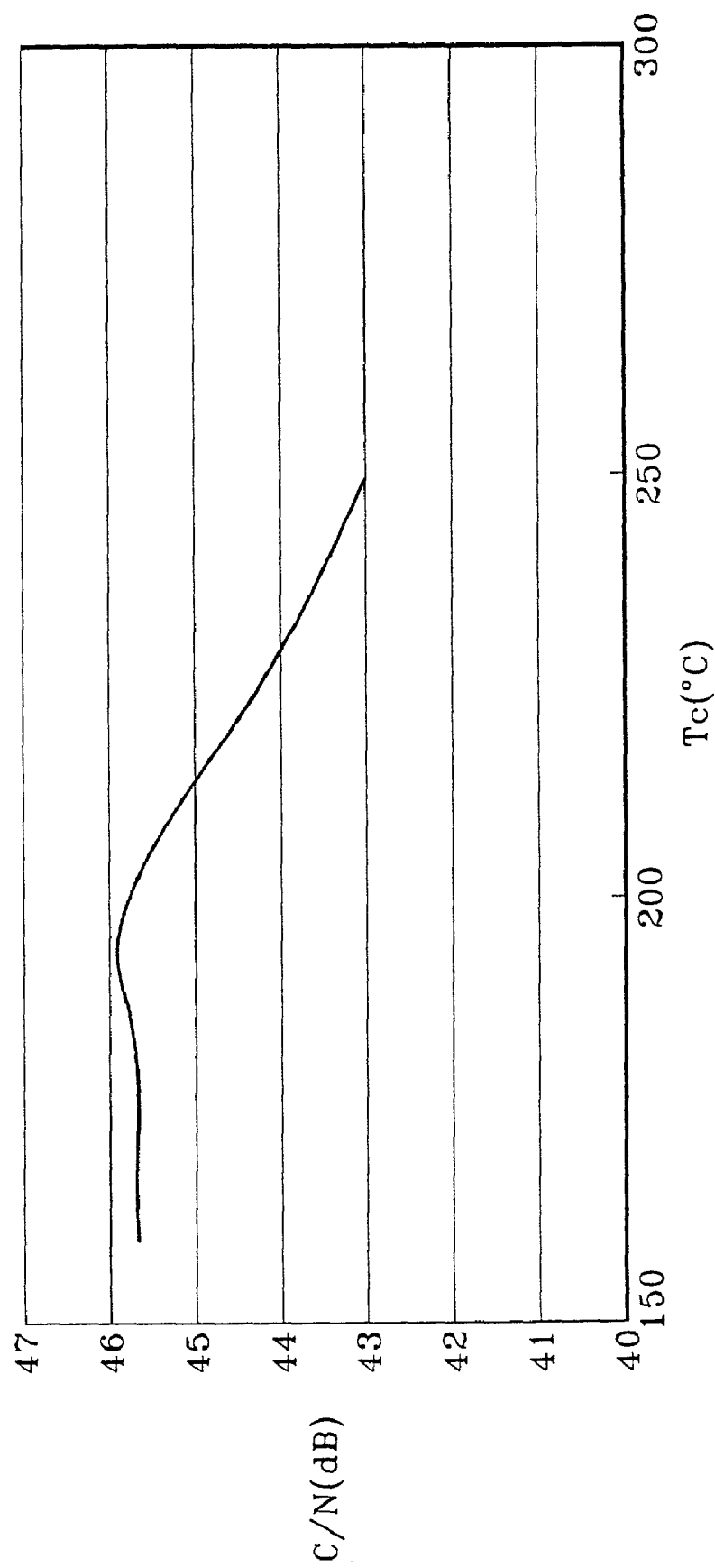
FIG. 4 is a graph that shows the relationship between the Tc of the cut-off layer and the C/N level.

FIG. 3 is a graph that shows the relationship between the Co (cobalt) composition of the cut-off layer and the Curie temperature Tc. FIG. 4 is a graph that shows the relationship between the Tc of the cut-off layer and the C/N level.

In FIG. 3, as variable x in the Co composition $Tb_{18}$ $(FeCo_x)_{82}$ of the cut-off layer gradually increases, the Curie temperature gradually rises, and the C/N level starts to drop from a point near 200° C. (as shown in FIG. 4), which is the approximate Curie temperature of the recording layer. Based on these results, it is understood that the preferred Curie temperature for the cut-off layer is a temperature that is equal to or less than the Curie temperature of the recording layer.

In addition, for the sake of comparison, a magneto-optical storage medium was prepared in which the cut-off layer was omitted from the medium construction that was based on previously discussed conditions. This resulted in a low C/N level of 43.8 dB. Furthermore, in the case of a magneto-optical storage medium in which both the transfer layer and cut-off layer were omitted from the medium construction that was based on previously discussed conditions, these results also showed a low C/N level of 42.2 dB.

With regard to improving the C/N level based on the cut-off layer, it is unclear as to an exact mechanism for achieving this, but during recording it is believed that a transfer layer comprised of GdFeCo can reduce the adverse effects with regard to the formation of marks on the recording layer. In other words, the recording operation initially calls for the formation of marks on the recording layer, followed by the transfer of these marks to the transfer layer through a switched connection process. However, if there is no cut-off layer, the marks that are formed on the GdFeCo transfer layer will transfer to the recording layer, and it is believed that this effect will cause a drop in the C/N level. Since a layer comprised of GdFeCo does not provide for favorable formation of marks, the occurrence of this type of reverse transfer causes the mark configurations to become disorganized, which is believed to result in a drop in the C/N level. Furthermore, compared to TbFeCo, GdFeCo has a high level of Ms (magnetization), and for this reason the transfer characteristics are improved when GdFeCo is used for the transfer layer due to the magnetostatic bonding of the marks from the transfer layer to the playback layer.

Based on the above, the construction of the transfer layer/cut-off layer/recording layer as described in this invention provides favorable mark formation on the recording layer during the recording operation and also provides for favorable playback of the CAD type medium.

Furthermore, through the use of the medium construction as described in this invention, there is no longer the need that previously existed for the recording layer to function as a transfer layer, and therefore there is also no longer a need to use a TM-rich composition for the recording layer. Accordingly, by using a compensating substance or an RE-rich composition, it is possible to achieve a reduction in the magnetic field required for erasure.

Note that for a transfer layer, it is acceptable to add Dy (dysprosium) to GdFeCo. However, if too much Dy is added, it will become impossible to conduct a favorable transfer of marks from the recording layer to the transfer layer through a switched connection process. Therefore, the preferred amount to add is approximately 1%–10% maximum (or an amount greater than 0%, but not to exceed approximately 10%).

Figure 5:
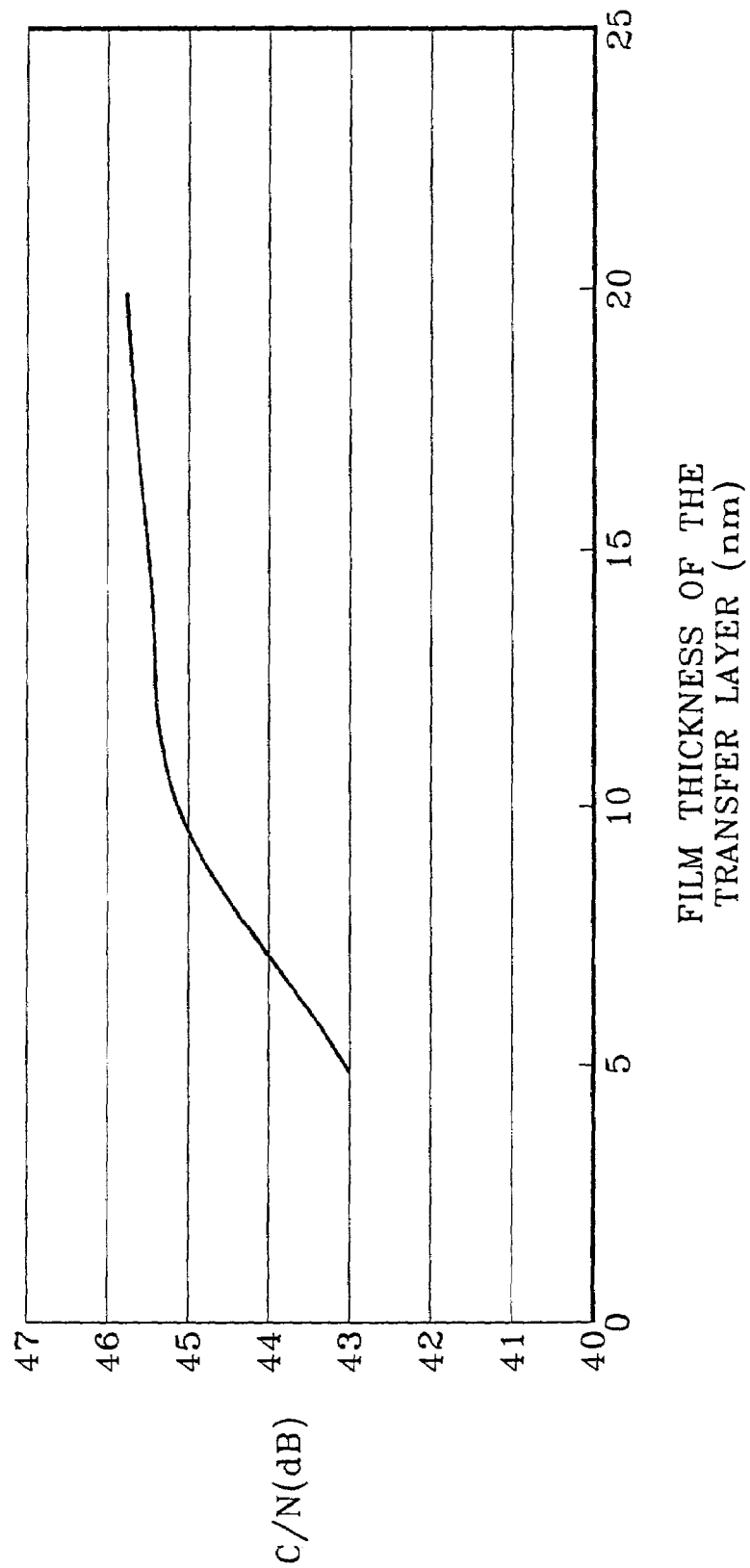
FIG. 5 is a graph that shows the relationship between the film thickness of the transfer layer and the C/N level.
Figure 6:
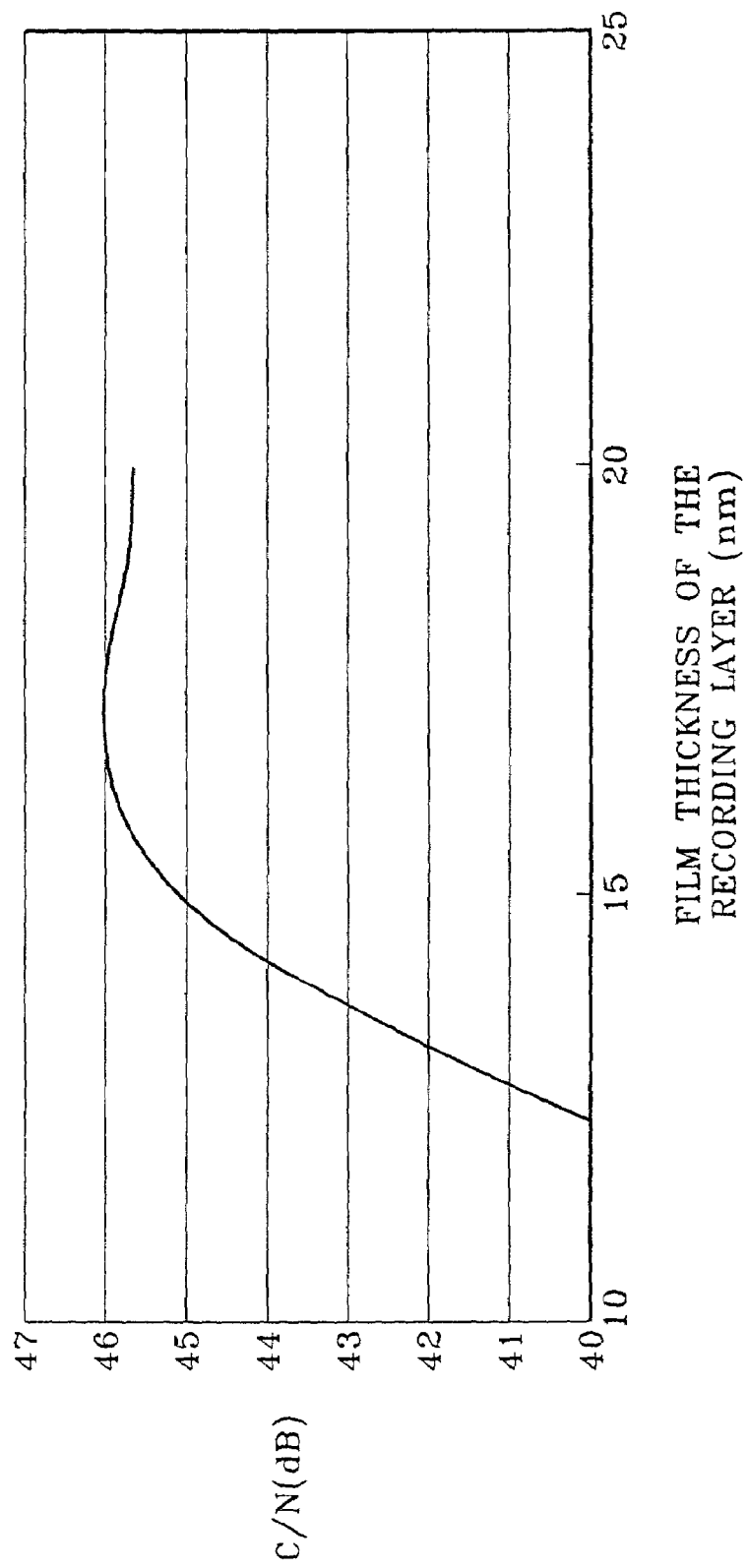
FIG. 6 is a graph that shows the relationship between the film thickness of the recording layer and the C/N level.

FIG. 5 shows the modified film thickness for the transfer layer, and FIG. 6 shows the modified film thickness for the recording layer, when $Tb_{18}Fe_{76}Co_6$ is used as the composition for the cut-off layer, and the compositions for the other layers are set to the same conditions discussed above.

In FIG. 5, an increase in the C/N level is shown for film thicknesses of approximately 7–20 nm for the transfer layer. In particular, within the range of approximately 10–20 nm, a saturated state is observed with only a small rate of change occurring. Although the following point is not illustrated in the drawing, note that C/N level will drop if the transfer layer film thickness is excessive, which means that a thickness of approximately 40 nm or less is preferred.

In FIG. 6, an increase in the C/N level is shown for film thicknesses of approximately 13–20 nm for the recording layer. In particular, within the range of approximately 15–20 nm, a saturated state is observed with only a small rate of change occurring. Although the following point is not illustrated in the drawing, note that C/N level will drop if the recording layer film thickness is excessive, which means that a thickness of approximately 40 nm or less is preferred.

From these results, it can be understood that when the respective film thicknesses for the transfer layer and the recording layer are equal to or greater than the film thickness for the cut-off layer, recording is conducted favorably, resulting in an improved C/N level.

The following explanation pertains to the reduction in cross-talk from marks that are recorded in adjacent tracks. A magneto-optical storage medium is prepared according to the following: $Gd_{29}Fe_{51}Co_{20}$ is used to form a playback layer 253 with a film thickness of 20 nm; $Tb_{18}Fe_{76}Co_6$ is used to form a cut-off layer 256 with a film thickness of 8 nm; the composition of the transfer layer 255 is set to $Gd_x(Fe_{74}Co_{26})_{100-x}$; and the composition of the recording layer 257 is set to $Tb_y(Fe_{86}Co_{14})_{100-y}$; where x and y above are variables that are modified accordingly. The SiN and Al layers, as well as the layer thickness for each, follow the same conditions as previously stated.

Figure 7:
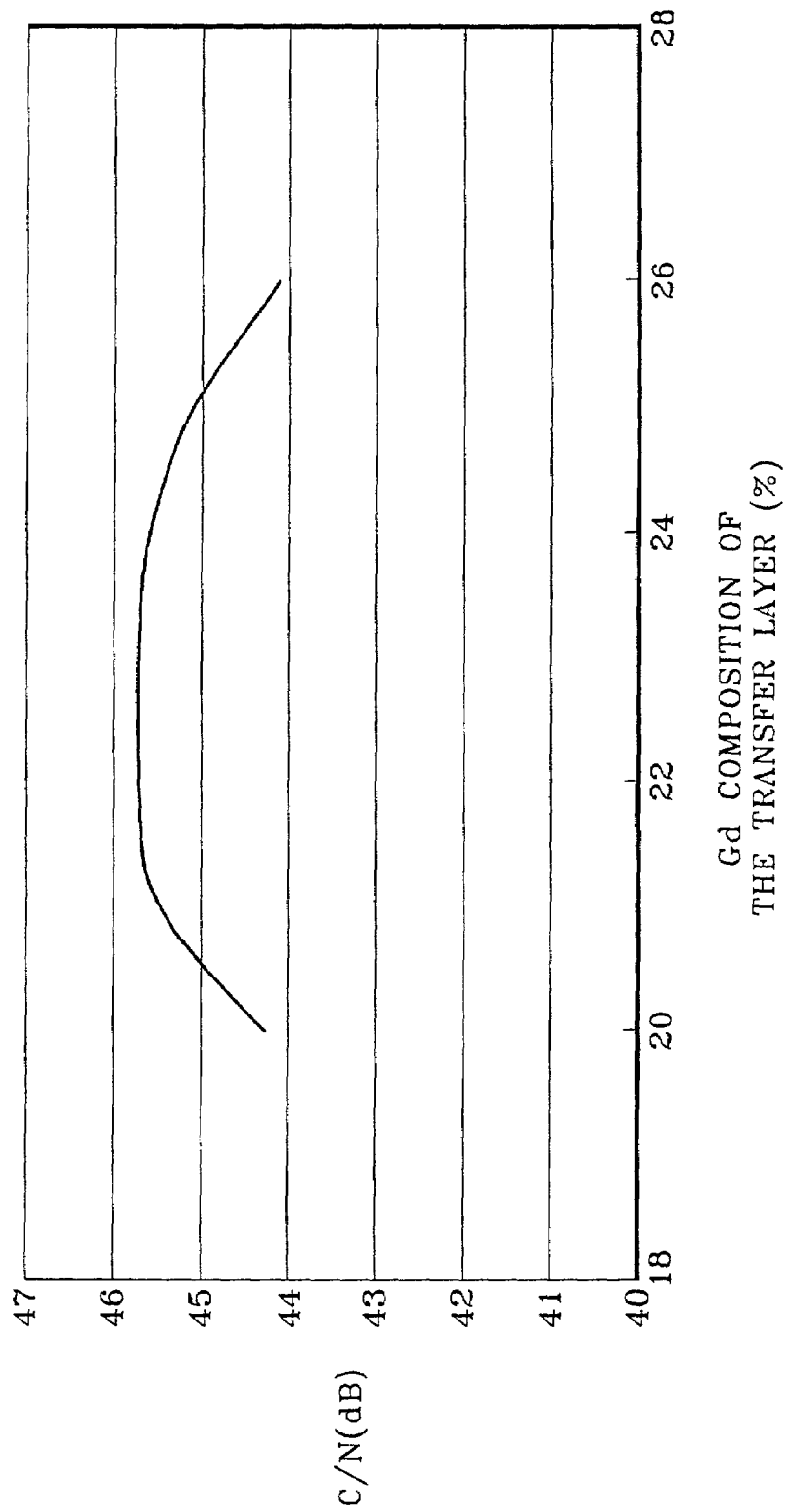
FIG. 7 is a graph that shows the relationship between the Gd composition of the transfer layer and the C/N level.

Given a Tb composition of 23% for the recording layer 257 and various changes that are made to the Gd composition of the transfer layer 255 during preparation, the measurement results for the C/N levels are shown in FIG. 7. As this figure shows, when the Gd composition of the transfer layer is an RE-rich composition of 25% or more, the drop in transfer characteristics with respect to the playback layer causes a drop in the C/N level.

Accordingly, it is believed that a range from a compensating substance (in which Gd is approximately 25%) to an FeCo-rich composition (TM-rich composition) is preferred in the case of the transfer layer. Furthermore, in the case where Gd is approximately 20% or less, there is a drop in recording characteristics as well as in the C/N level, but an increase in the C/N level is seen within a range of approximately 21–25%.

Figure 8:
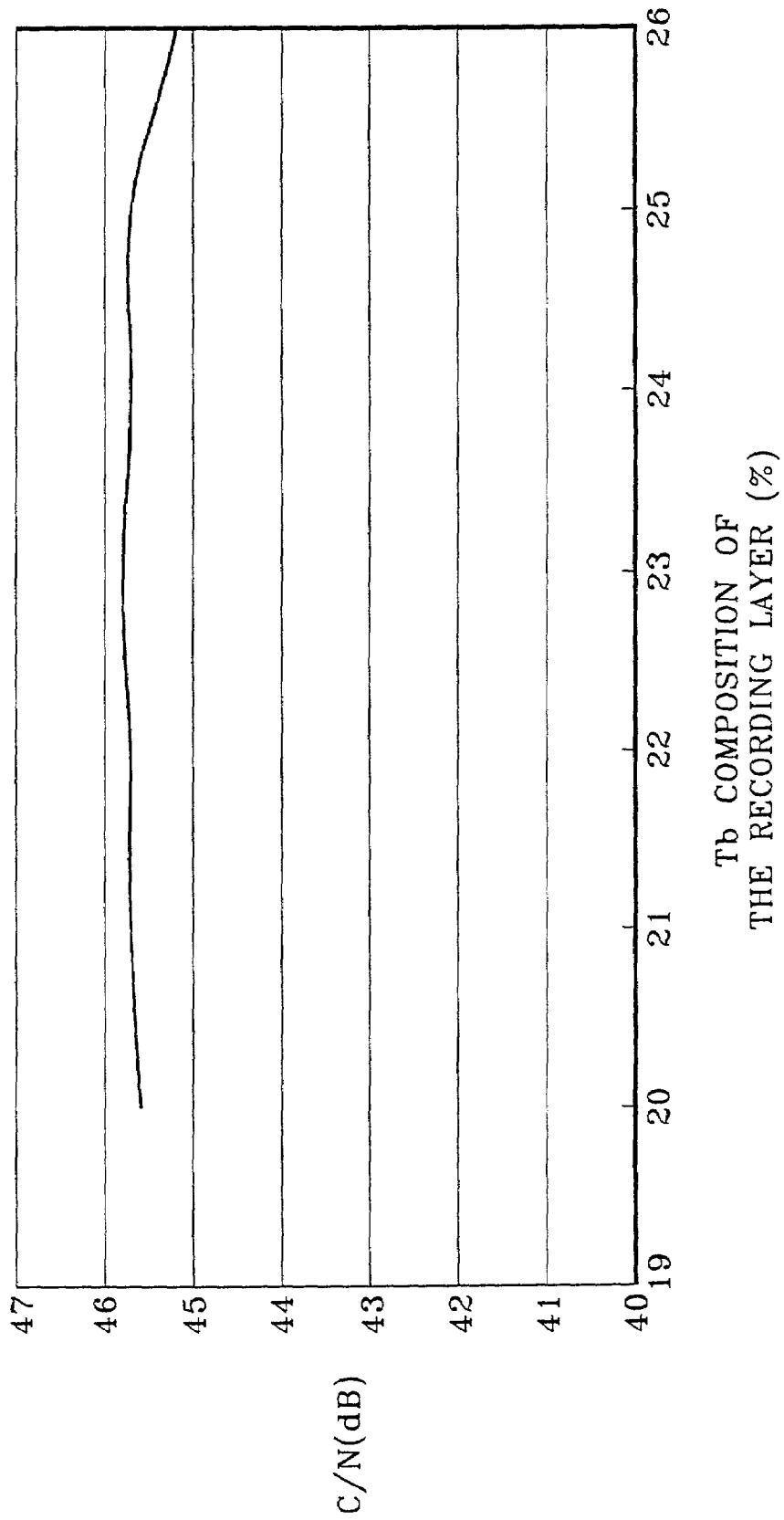
FIG. 8 is a graph that shows the relationship between the Tb composition of the recording layer and the C/N level.

In FIG. 8, $Gd_{23}(Fe_{74}Co_{26})$ is used as the composition for the transfer layer, and the C/N results based on modifications to the Tb composition of the recording layer are shown. This figure shows that although the C/N level starts to drop when the Tb portion of the recording layer is at 25% or greater, the drop is so slight that it is relatively insignificant.

Figure 9:
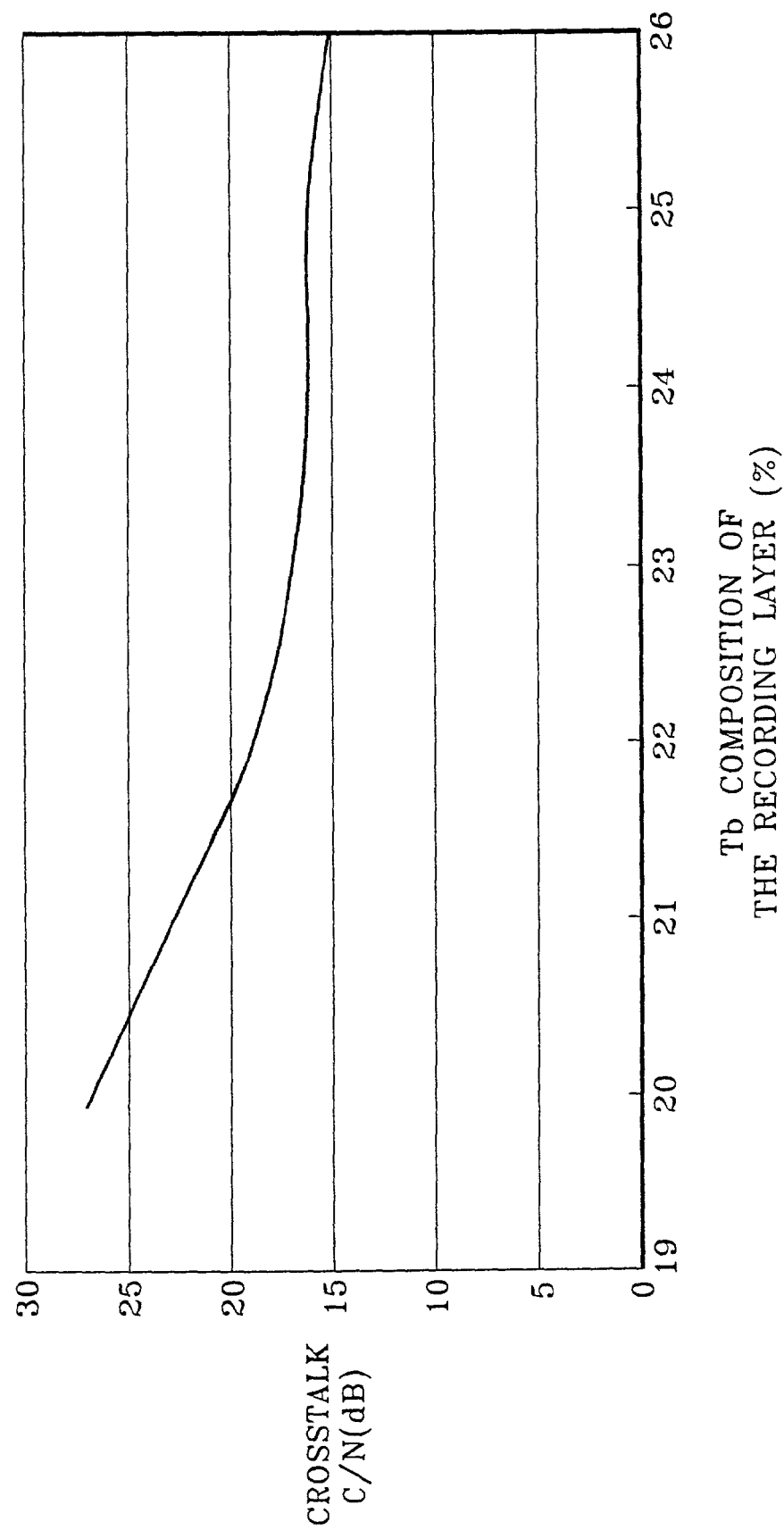
FIG. 9 is a graph that shows the relationship between the Tb composition of the recording layer and the cross-talk level.

For the FIG. 9 graph, a mark measuring 1.52 μm was recorded in the adjacent tracks on both sides. The C/N (cross-talk) level at the point where the signal from the mark starts to leak into the track during playback was recorded, along with the magnetic field He that was required for total erasure of the recorded mark.

In FIG. 9, it should be understood that the level of cross-talk is high given a TM-rich composition in which there is only a small amount of Tb within the recording layer. In order to sufficiently reduce the level of cross-talk, a preferable range is from a compensating substance in which the Tb portion of the recording layer is 23% or more to a Tb-rich composition.

Figure 10:
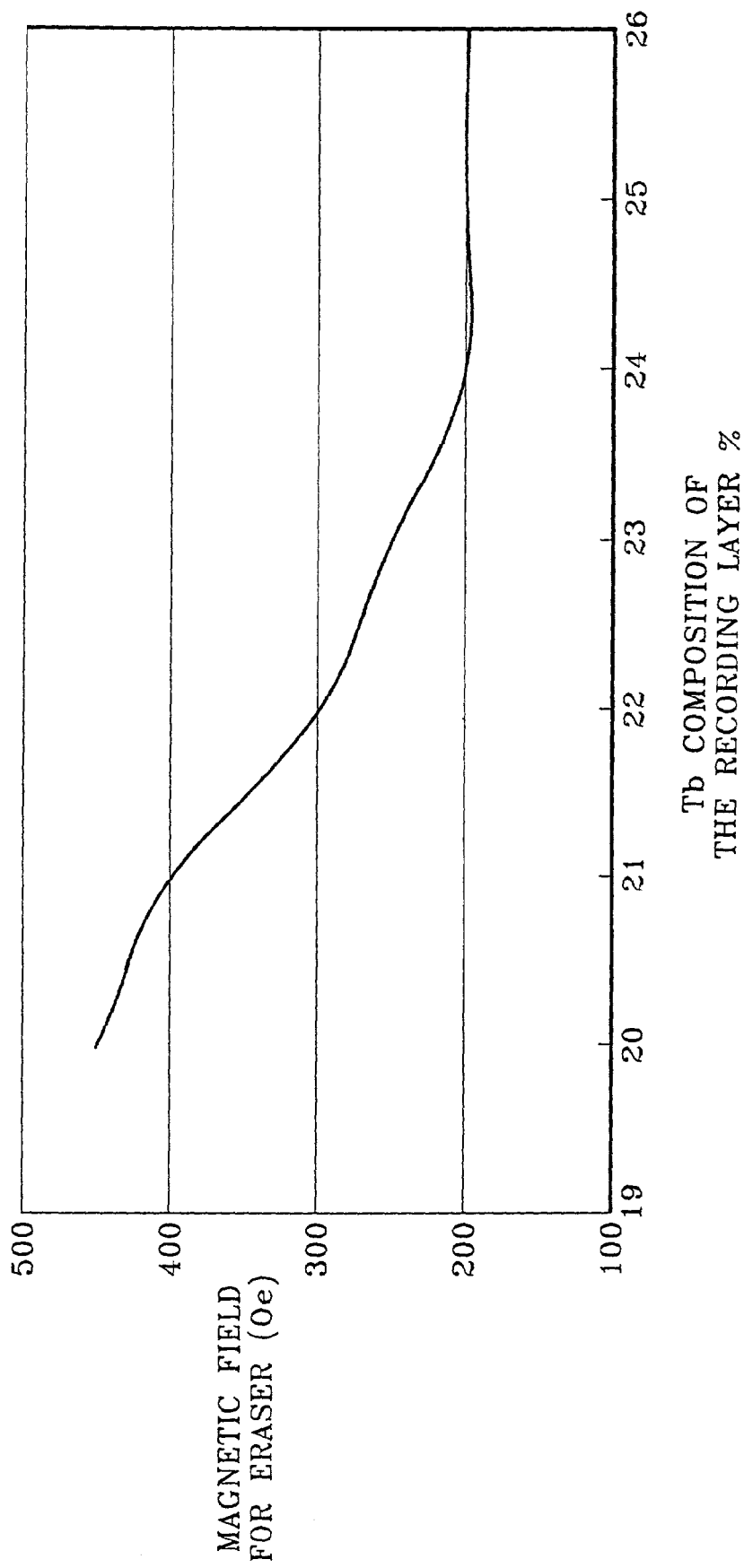
FIG. 10 is a graph that shows the relationship between the Tb composition of the recording layer and the magnetic field applied for erasure.

FIG. 10 shows the relationship between the Tb composition of the recording layer and the magnetic field applied for erasure. Given a Tb range of approximately 21–26%, the magnetic field required for erasure reaches a maximum of approximately 375 Oe, indicating that it is possible to reduce the magnetic field required for erasure. Particularly within a Tb range of approximately 22–26%, the magnetic field required for erasure reaches a maximum of approximately 275 Oe, showing that the process can be completed even with a relatively small erasure magnetic field.

Thus, it is believed that particularly within a range from a compensating substance in which the Tb portion of the recording layer is 23% or more to a Tb-rich composition, it becomes possible to reduce the magnetic field required for erasure. Note that if the Tb portion of the recording layer is excessive, the recording operation will become unstable, and a drop in the C/N level will occur. Therefore, a preferable level for Tb is approximately 26% maximum, and if this level is maintained, it also becomes possible to reduce the magnetic field required for erasure.

Figure 11:
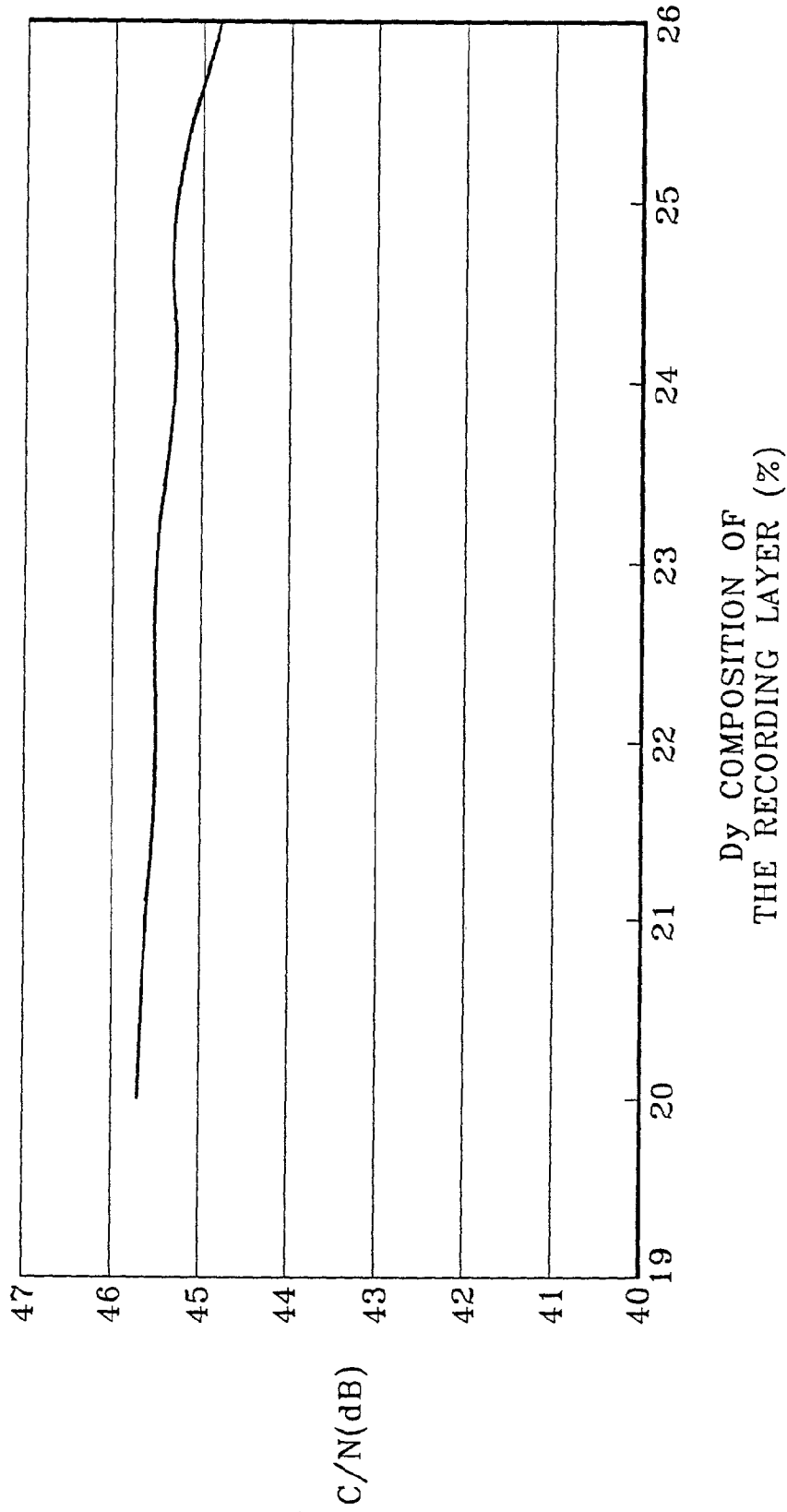
FIG. 11 is a graph that shows the relationship between the Dy composition of the recording layer and the C/N level.

Next, FIG. 11 shows the results of C/N measurements when DyFeCo is used for the recording layer. Here, the recording layer composition is modified to $Dy_z(Fe_{70}Co_{30})_{100-z}$.

FIG. 11 shows that the C/N level starts to drop when the Dy portion of the recording layer is at 25% or greater, although no significant changes are seen. Even given the value for C/N, a characteristic range of approximately 45 dB–46 db is shown, which is the same as in the case of the TbFeCo recording layer discussed earlier.

Figure 12:
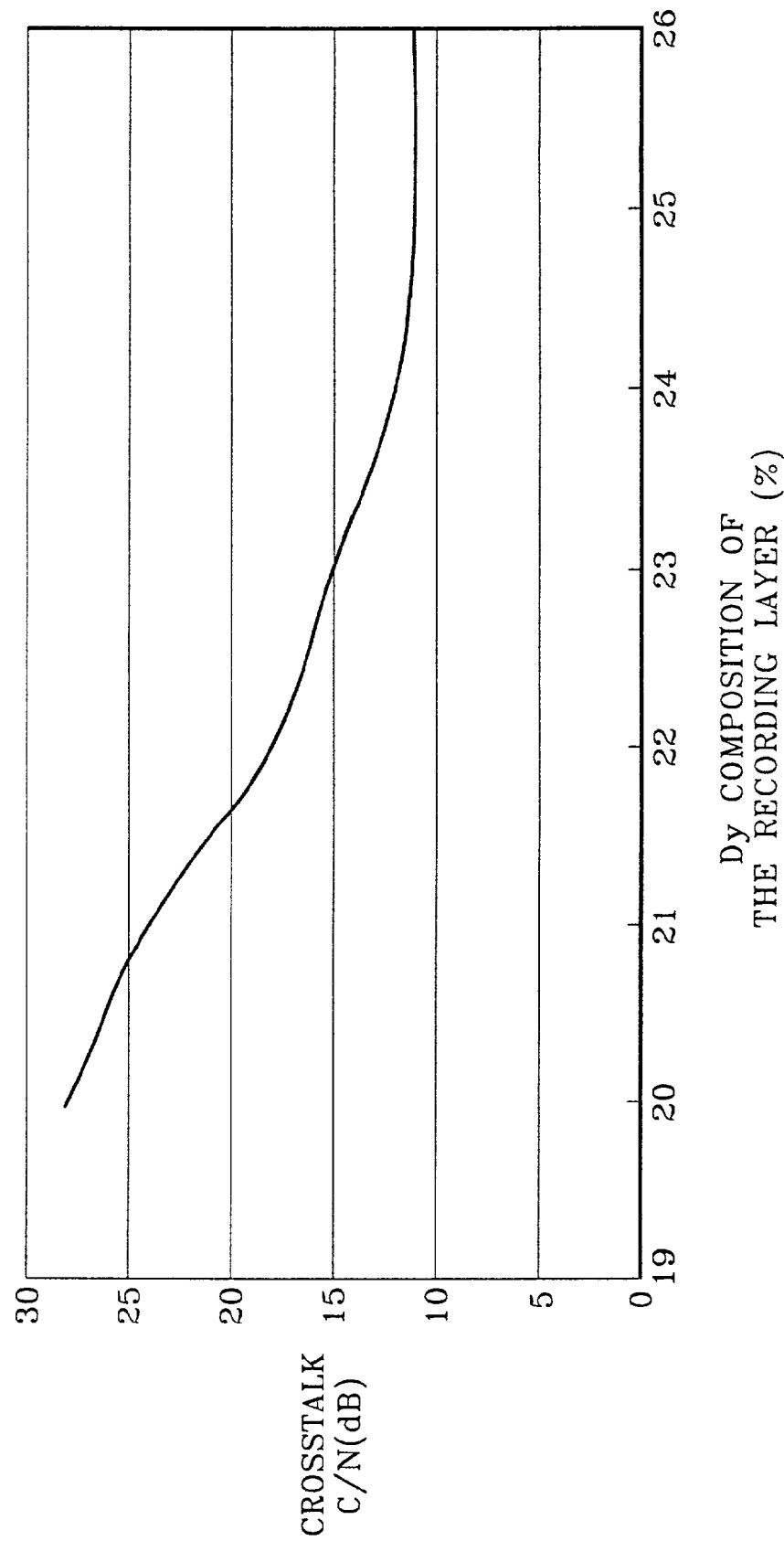
FIG. 12 is a graph that shows the relationship between the Dy composition of the recording layer and the cross-talk level.

For the FIG. 12 graph, a mark measuring 1.52 μm was recorded in the adjacent tracks on both sides. The C/N (cross-talk) level at the point where the signal from the mark starts to leak into the track during playback was recorded, along with the magnetic field He that was required for total erasure of the recorded mark.

In FIG. 12, it is understood that the level of cross-talk is high given a TM-rich composition in which there is only a small amount of Dy within the recording layer. In order to sufficiently reduce the level of cross-talk, a preferable range is from a compensating substance in which the Dy portion of the recording layer is 23% or more to a Dy-rich composition. Note that the cross-talk reduction effect is greater than in the case of the TbFeCo recording layer (as shown in FIG. 9).

Figure 13:
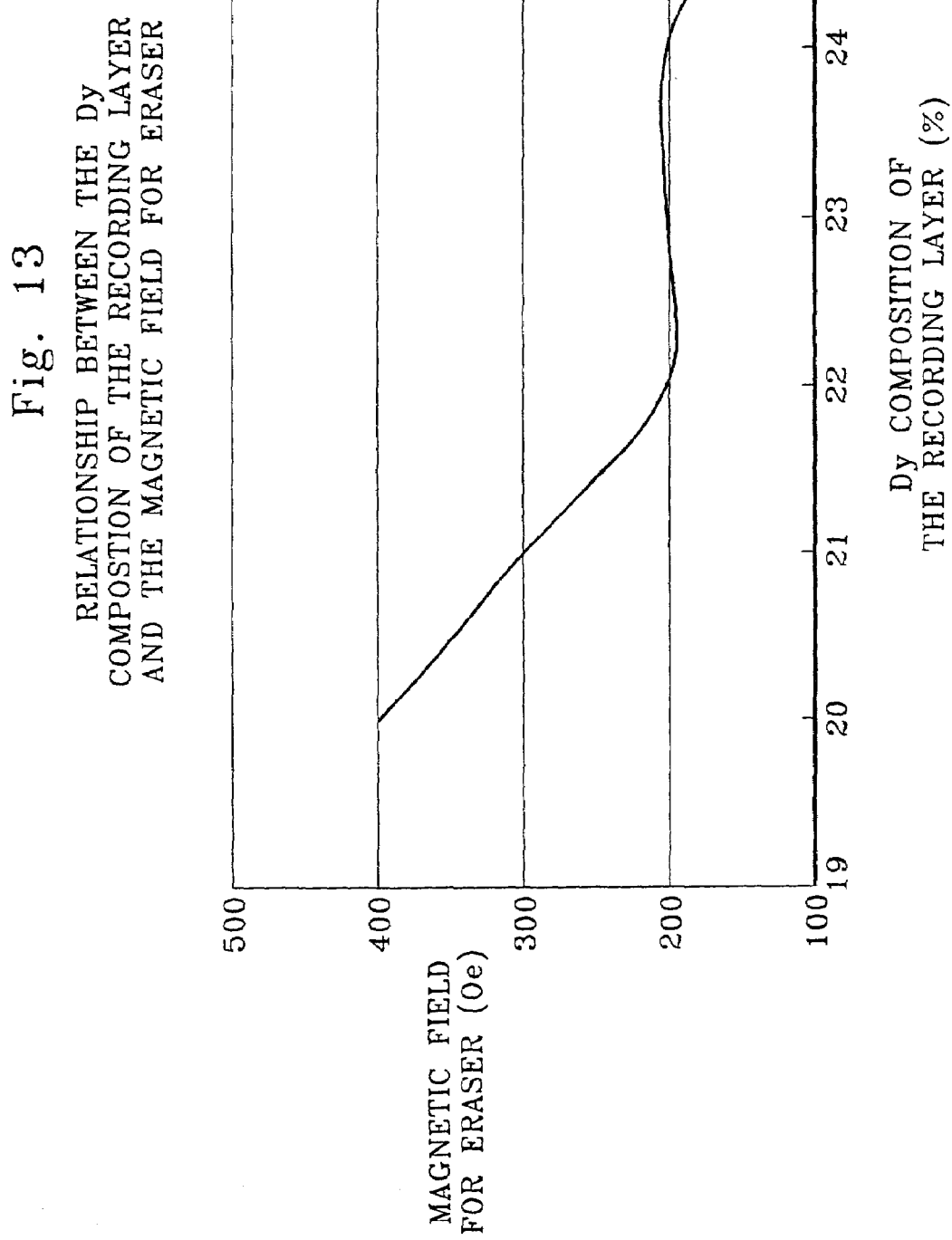
FIG. 13 is a graph that shows the relationship between the Dy composition of the recording layer and the magnetic field applied for erasure.

FIG. 13 shows the relationship between the Dy composition of the recording layer and the magnetic field applied for erasure. Given a Dy range of approximately 21–26%, the magnetic field required for erasure reaches a maximum of approximately 300 Oe, indicating that it is possible to reduce the magnetic field required for erasure. Particularly within a Dy range of approximately 22–26%, the magnetic field required for erasure reaches a maximum of approximately 200 Oe, showing that the process can be completed even with a relatively small erasure magnetic field.

Within a range from a compensating substance in which the Dy portion of the recording layer is 23% or more to a Dy-rich composition, it becomes possible to reduce the magnetic field required for erasure. Note that if the Dy portion of the recording layer is excessive, the recording operation will become unstable, and a drop in the C/N level will occur. Therefore, a preferable level for Dy is approximately 25% maximum, and if this level is maintained, it also becomes possible to reduce the magnetic field for erasure.

As explained above, by using a recording layer within a range from a compensating substance to a TM-rich composition for a magneto-optical storage medium with the type of construction described in this invention, it is not only possible to reduce the level of cross-talk, but the magnetic field required for erasure can also be reduced.

Furthermore, by utilizing the forms of construction and composition described in this invention, the magnetization becomes reversed at room temperature and is cancelled out in the case of the transfer layer, in which the range is from a compensating substance to a TM-rich composition, as well as the recording layer in which the range is from a compensating substance to an RE-rich composition. Since magnetic fields are no longer generated from adjacent tracks that are near room temperature, it is possible to control the level of cross-talk.

For the recording layer, it is also possible to achieve the same results using another type of material such as TbDyFeCo or TbGdFeCo.

Furthermore, this invention is not limited to the use of a CAD type medium, and by utilizing heat and a magnetic field it is possible to apply this invention to a magneto-optical storage medium for the purpose of playing back marks that are even smaller than the beam spot, such as in the case of magneto-optical storage media used for magnetic amplification playback.

Figure 14:
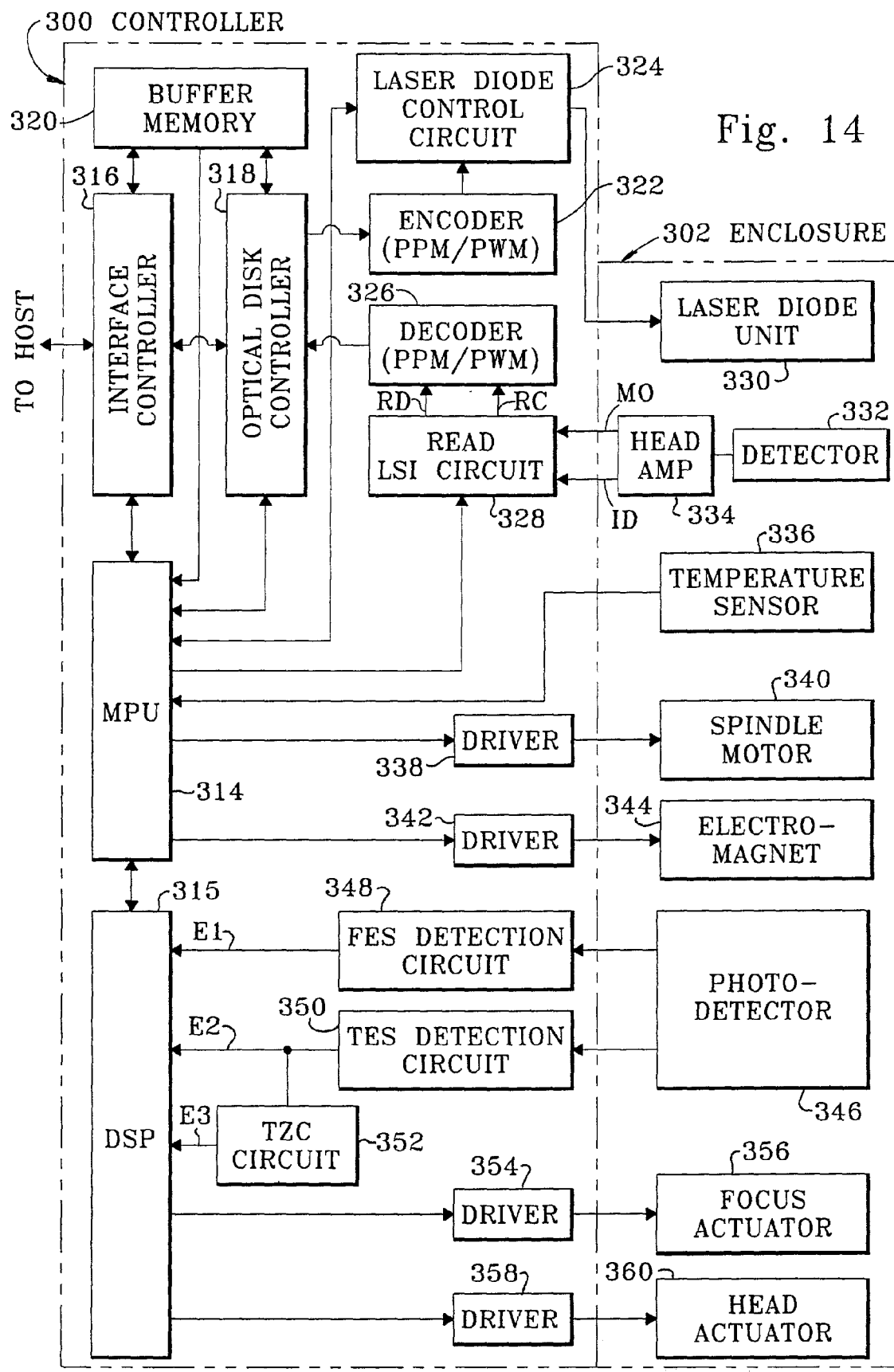
FIG. 14 is a block diagram of an example of an optical disk drive in which the present invention is applied.

FIG. 14 is a block diagram of an optical disk drive based on an example of a storage device/optical device in which this invention is applied. This optical disk drive consists of a controller 300 and an enclosure 302. The controller 300 is equipped with the following: an MPU 314 that conducts the control function for the entire unit; an interface controller 316 that transmits the data to and from the host; an optical disk controller 318 that provides the formatting and ECC functions required for the read/write operations of the storage medium; and a buffer memory device 320.

An encoder 322, which is used to process the write data, is installed according to instructions provided by the optical disk controller 318. Furthermore, once the instructions are received from the MPU 314, the laser diode controller circuit 312 and laser diode unit 330 are activated in order to send out light beams with multiple levels of power within a range of approximately 1 mW–5 mW.

In addition, the output from the detector 332, which is used to detect the return light from the optical disk, is processed via the head amp 334, read LSI circuit 328, and decoder 326. Once playback data has been obtained, the data is transmitted to the host by the optical disk controller 318.

The detector 332 receives the return light from the optical disk, and the output is amplified by the head amplifier 334, after which the ID (embossed pit) signal and MO (magneto-optical) signal are output to the read LSI circuit 328. The read LSI circuit 328 prepares the read clock RC and the read data RD from the ID signal and MO signal that have been input, and these are then output to the decoder. The MPU 314 conducts environmental temperature monitoring of the inside of the devices, as detected by the temperature sensor 336, and the light emission power is optimized within the laser diode unit 330 based on the environmental temperature. In addition, the MPU 314 controls the spindle motor 340 through a driver 338 and also controls the magnetic field generator (electromagnet) 344 through another driver 342. During at least one of the processes, namely playback (reproduction), recording, or erasure, electromagnet 344 delivers a magnetic field to the magneto-optical disk.

Note that in the case of a magneto-optical storage medium with the type of construction described above, this embodiment provides the following range settings: a playback (reproduction) magnetic field of approximately −10 to −100 oersted, a recording magnetic field of approximately −200 to −300 oersted, and an erasure magnetic field of approximately 200 to 300 oersted. Note that 1 Oe (oersted) is equal to 1 A/m (amperes/meter).

The DSP 315 conducts servo control in which an objective lens, which has been loaded onto a head actuator based on the servo error signal, is placed in the target position of the optical disk. This servo control operation serves two functions, one of which is control in the tracking direction, in which the objective lens is positioned on the target track of the optical disk, and the other of which is control in the focus direction, in which the objective lens is moved to the appropriate focal position with respect to the optical disk. In correspondence with this servo control, the following items are installed: a photodetector 346, a focus error signal preparation circuit 348, a track error signal preparation circuit 350, and a track zero cross (TZC) detection circuit 352.

The focus error signal preparation circuit 348 creates a focus error signal through a process such as the knife-edge method. The DSP 315 drives the focus actuator 356 using a driver 354 based on the focus error signal, after which it determines the placement of the objective lens in the focal position in the optical axis direction of the light beam.

Furthermore, through utilization of the track error signal, a driver 358 drives the head actuator 360, which uses a VCM (voice coil motor), in the transverse direction of the track, after which it places the objective lens in the target track/target sector on top of the optical disk.

In cases where the type of storage medium previously discussed is used (such as during initial settings, loading, access, environmental changes, etc.), an optical device with the type of construction described above can conduct at least recording and/or playback within a target position of the medium by setting/controlling the light beam, which has a specified power such as a recording power level or a playback power level that corresponds to the respective medium according to the light beam control portion. This can also be accomplished by setting/controlling the orientation and/or size of the magnetic field that corresponds not only to the respective medium according to the magnetic field generator, but also to the processing that is conducted for recording, erasure, playback, etc. Note that the storage medium can be an interchangeable type or a type that is permanently installed within a device.

Furthermore, the medium described by this invention includes a range of applicable configurations, such as a card or a tape configuration, and this invention can be applied to any optical device with the type of construction that corresponds to any of these media configurations.

As explained above, by installing a cut-off layer between the recording layer and transfer layer, it is possible to provide favorable characteristics for the recording layer and the transfer layer. It also becomes possible to reduce the magnetic field required for erasure and to ensure sufficient magnetization Ms during transfer operations. Furthermore, an improvement in the C/N level can be achieved. Accordingly, it becomes possible to reduce the level of cross-talk from adjacent tracks and to provide a high level of density while further reducing the level of track density.

What is claimed is:

1. A magneto-optical storage medium comprising:
    a playback layer that displays easy in-plane magnetization characteristics at room temperature when considered as a monolayer;
    a non-magnetic layer positioned below said playback layer;
    a transfer layer positioned below said non-magnetic layer, said transfer layer having easy magnetization characteristics in the vertical direction at room temperature when considered as a monolayer;
    a cut-off layer positioned below said transfer layer; and
    a recording layer positioned below said cut-off layer, said recording layer having easy magnetization characteristics in the vertical direction at room temperature when considered as a monolayer;
    wherein $Tc_s < Tc_k$, where $Tc_s$ is the Curie temperature for said cut-off layer and $Tc_k$ is the Curie temperature for said recording layer, and $Tc_1 > Tc_s$, where $Tc_1$ is the Curie temperature for said transfer layer, said transfer layer being made of a material comprised of GdFeCo, and wherein a Gd percentage of said GdFeCo is approximately 21–25%.

2. The magneto-optical storage medium as defined in claim 1, further wherein $Tc_t > Tc_s$, where $Tc_t$ is the Curie temperature for said transfer layer.

3. The magneto-optical storage medium as defined in claim 1, wherein said transfer layer is a compensating substance at room temperature.

4. The magneto-optical storage medium as defined in claim 1, wherein said transfer layer is TM-rich at room temperature.

5. The magneto-optical storage medium as defined in claim 1, wherein said transfer layer is made of a material comprised of GdDyFeCo and is a compensating substance at room temperature, and wherein a Dy percentage of said GdDyFeCo is approximatley 1–10%.

6. The magneto-optical storage medium as defined in claim 1, wherein said transfer layer is made of a material comprised of GdDyFeCo and is TM-rich at room temperature, and wherein a Dy percentage of said GdDyFeCo is approximately 1–10%.

7. The magneto-optical storage medium as defined in claim 1, wherein said cut-off layer is made from a material selected from the following group: TbFe and TbFeCo.

8. The magneto-optical storage medium as defined in claim 1, wherein said recording layer includes a rare-earth transition metal and is a compensating substance at room temperature.

9. The magneto-optical storage medium as defined in claim 1, wherein said recording layer includes a rare-earth transition metal and is RE-rich at room temperature.

10. The magneto-optical storage medium as defined in claim 1, wherein said recording layer is made from a material selected from the following group: TbFeCo, DyFeCo, TbDyFeCo and GdTbDyFeCo.

11. The magneto-optical storage medium as defined in claim 1, wherein:
    said playback layer is RE-rich at room temperature;
    said transfer layer is TM-rich at room temperature; and
    said recording layer is RE-rich at room temperature.

12. The magento-optical storage medium as defined in claim 1, wherein said recording layer is made of a material comprised of DyFeCo, and wherein a Dy percentage of DyFeCo is approximately 22–25%.

13. An optical disk drive adapted to insert and remove at least one magneto-optical storage medium, comprising:
a spindle motor for rotating said at least one magneto-optical storage medium; and
means for reading and writing information from/to said at least one magneto-optical storage medium;
wherein said at least one magneto-optical storage medium includes:
a playback layer that displays easy in-plane magnetization characteristics at room temperature when considered as a monolayer;
a non-magnetic layer positioned below said playback layer;
a transfer layer positioned below said non-magnetic layer, said transfer layer having easy magnetization characteristics in the vertical direction at room temperature when considered as a monolayer;
a cut-off layer positioned below said transfer layer; and
a recording layer positioned below said cut-off layer, said recording layer having easy magnetization characteristics in the vertical direction at room temperature when considered as a monolayer;
wherein $Tc_s < Tc_k$, where $Tc_s$ is the Curie temperature for said cut-off layer and $Tc_k$ is the Curie temperature for said recording layer, and $Tc_t > Tc_s$, where $Tc_t$ is the Curie temperature for said transfer layer, said transfer layer is made of a material comprised of GdFeCo, and wherein a Gd percentage of said GdFeCo is approximately 21–25%.

14. The optical disk drive as defined in claim 13, wherein:
said playback layer is made of a material comprised of GdFeCo;
said cut-off layer is made from a material selected from the following group: TbFe and TbFeCo; and
said recording layer is made from a material selected from the following group: TbFeCo, DyFeCo, TbDyFeCo and GdTbDyFeCo.

15. The optical disk drive a defined in claim 13, wherein:
said playback layer is made of a material comprised of GdFeCo;
said transfer layer is made of a material comprised of GdDyFeCo, and wherein a percentage of said GdDyFeCo is approximately 1–10%;
said cut-off layer is made from a material selected from the following group: TbFe and TbFeCo; and
said recording layer is made from a material selected from the following group: TbFeCo, DyFeCo, TbDyFeCo and GdTbDyFeCo.

16. The optical disk drive as defined in claim 13, wherein:
said playback layer is RE-rich at room temperature;
said transfer layer is TM-rich at room temperature; and
said recording layer is RE-rich at room temperature.

17. The optical drive as defined in claim 13, wherein said recording layer is made of a material comprised of DyFeCo, and wherein a Dy percentage of DyFeCo is approximately 22–25%.

* * * * *

UNITED STATES PATENT AND TRADEMARK OFFICE
CERTIFICATE OF CORRECTION

PATENT NO. : 7,050,361 B2  Page 1 of 1
APPLICATION NO. : 10/104890
DATED : May 23, 2006
INVENTOR(S) : Hosokawa It is certified that error appears in the above-identified patent and that said Letters Patent is hereby corrected as shown below:

Col. 12, line 19, delete "$Tc_1 > Tc_s$, where $Tc_1$" and insert -- $Tc_t > Tc_s$, where $Tc_t$ --.

Col. 12, lines 26-27, delete "further wherein $Tc_t > Tc_s$, where $Tc_t$ is the Curie temperature for said transfer layer" and insert --wherein said playback layer is made of GdFeCo and is RE-rich at room temperature -- .

Signed and Sealed this

Nineteenth Day of December, 2006

JON W. DUDAS
*Director of the United States Patent and Trademark Office*